US005207855A

United States Patent [19]

Nyfeler et al.

[11] Patent Number: 5,207,855

[45] Date of Patent: May 4, 1993

[54] APPARATUS FOR STICKING ON STAMPS FROM AN EMBOSSING FOIL

[75] Inventors: Alex Nyfeler; Michael Wessner, both of Baar; Ohannes Minnetian, Lucerne, all of Switzerland

[73] Assignee: Landis & Gyr Betriebs AG, Zug, Switzerland

[21] Appl. No.: 618,632

[22] Filed: Nov. 27, 1990

[30] Foreign Application Priority Data

Dec. 21, 1989 [CH] Switzerland ........................ 04571/89
Apr. 19, 1990 [CH] Switzerland ........................ 01332/90

[51] Int. Cl.[5] .......................... B44C 1/16; B32B 31/00

[52] U.S. Cl. .................................... 156/351; 156/361; 156/540; 156/541; 156/553

[58] Field of Search ............... 156/361, 540, 541, 350, 156/351, 352, 553, 209, 220, 554

[56] References Cited

U.S. PATENT DOCUMENTS 4,063,500 12/1977 Abe ........................................ 101/25
4,541,335 9/1985 Tokuno et al. ...................... 101/181
4,701,235 10/1987 Mitsam ................................ 156/582
5,022,950 7/1991 Ingalls et al. ...................... 156/361

FOREIGN PATENT DOCUMENTS 0401466 12/1990 European Pat. Off. ............ 156/361

*Primary Examiner*—David A. Simmons
*Assistant Examiner*—J. Sells
*Attorney, Agent, or Firm*—Marmorek, Guttman & Rubenstein

[57] ABSTRACT

The operation of sticking stamps from a foil in strip form at predetermined locations on a substrate which has motifs printed thereon and which is pulled through at least one sticking station at a predetermined forward feed speed is effected by means of pressing portions, which are raised radially above a pressing cylinder, in the sticking station. The pressing portions have curved pressing surfaces which are parts of a larger cylindrical surface which is concentric with respect to the pressing cylinder and which during each sticking phase roll against a backing cylinder and transfer the stamps onto the substrate. The strip speed of the foil may also be lower than the forward feed speed. The foil used may be a hot embossing foil with a layer of adhesive or an embossing foil without a layer of adhesive, while the apparatus, for sticking the embossing foil onto the substrate has an applicator mechanism for adhesive upstream of the sticking station and an irradiation station for the activation of adhesive layers.

12 Claims, 5 Drawing Sheets

APPARATUS FOR STICKING ON STAMPS FROM AN EMBOSSING FOIL

FIELD OF THE INVENTION

The invention relates to an apparatus for sticking stamps onto a substrate.

Such apparatuses are suitable, for example, for sticking individual visually striking stamps onto a printed item in strip form.

BACKGROUND OF THE INVENTION

GB 238 360 A discloses an apparatus for transferring portions of a hot embossing foil onto a substrate in strip form. A heated stamping or pressing member which can be moved up and down, at the bottom dead centre point of its movement, presses the hot embossing foil which is supplied on a carrier or backing strip, onto the substrate. The hot embossing foil being joined to the substrate while the backing strip and the substrate stop, are prevented from moving. As soon as the pressing member is lifted off, a fresh forward feed movement of the backing strip and the substrate takes place, with the backing strip and the unconsumed residue of the hot embossing foil being lifted off the substrate and rolled up.

EP 170 832 A1 discloses hot embossing foils with holograms. They are joined to a backing strip until they are stuck onto the substrate.

Swiss application CH 02 110/89-8 discloses a hot embossing foil with diffraction gratings and an additional clear protective layer which is fixedly connected thereto. When stamps are stuck onto a substrate from the hot embossing foil, they have to be stamped out at the same time.

Apparatuses are also known with, which a narrow hot adhesive foil strip, for example a magnetic strip, is continuously stuck onto a substrate in strip form in the longitudinal direction thereof, by use of a continuous-flow procedure. Portions of such substrates are used for bus and rail tickets, credit cards or the like.

SUMMARY AND OBJECTS OF THE INVENTION

The object of the invention is to provide an apparatus of the kind set forth in the opening part of this specification, which permits stamps to be stuck on a substrate at predetermined isolated locations thereon, in an inexpensive fashion.

In accordance with the invention that object is attained by the features of claim 1.

BRIEF DESCRIPTION OF THE DRAWINGS

Embodiments of the invention are described in greater detail hereinafter with reference to the accompanying drawings in which.

DESCRIPTION OF THE PREFERRED EMBODIMENT

Figure 1:
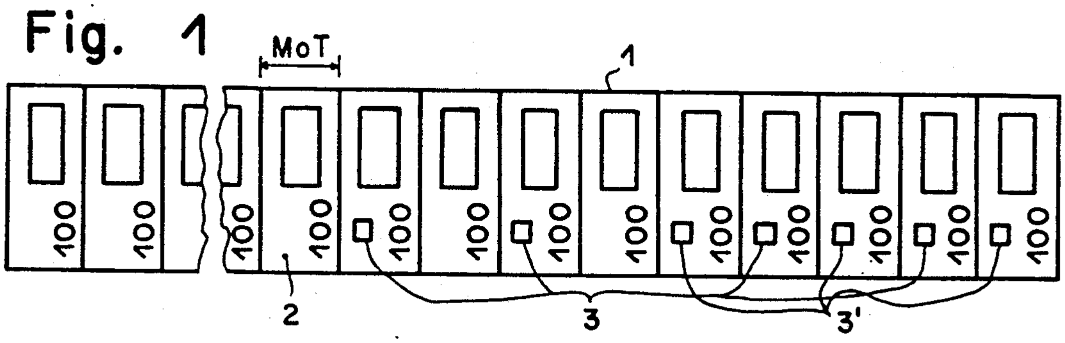
FIG. 1 shows a substrate.

In FIG. 1 reference numeral 1 denotes a substrate consisting of paper or plastic or metal foil in the form of a long strip or in sheet form. For example the substrate 1 is a paper strip on which motifs or designs 2 have been printed on one or both sides in a previous working operation, wherein the motif 2 comprises for example a number, a picture or image which is indicated herein by a small frame, and a background motif or design, as is known from banknotes or securities, bonds or share documents. The motifs 2 are disposed at a motif pitch MoT. It is also possible to envisage an arrangement of a plurality of parallel rows of motifs 2 on the substrate 1, that arrangement in respect of the motifs 2 being the case in particular in relation to substrates 1 in sheet form. The motif 2 is supplemented by a stamp 3 or 3' respectively which is stuck on at a predetermined location. The substrate 1 can be divided into individual securities, bonds or share documents by means of a device not illustrated herein, in accordance with the motif pitch MoT.

Figure 2:
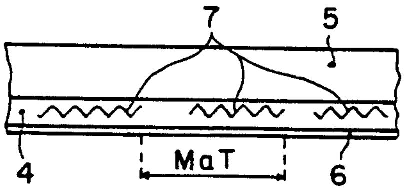
FIG. 2 shows a backing strip with a hot embossing foil.

For example the stamps 3, 3' come from a hot embossing foil 4 shown in FIG. 2. Because of its low tensile strength, it is stuck onto a carrier or backing strip 5 and on the side remote from the backing strip 5 has a layer of adhesive 6 which can be activated by heat. The stamps 3, 3' (FIG. 1) which are fixedly stuck on the substrate 1 (FIG. 1) after the thermal activation operation can be easily peeled from the backing strip 5, by applying a pulling force thereto.

Embedded into the hot embossing foil 4 are for example optically variable diffraction patterns 7 such as diffraction gratings or holograms, at the spacing of a stamp pitch MaT, wherein the material of the hot embossing foil 4 is transparent at least in relation to a part of the electromagnetic waves in the range of wavelengths from 0.3 to 10 μm. The stamp 3 or 3' which is stuck on the substrate forms for example a visually striking authentication feature of the bond, security or share document.

Figure 3:
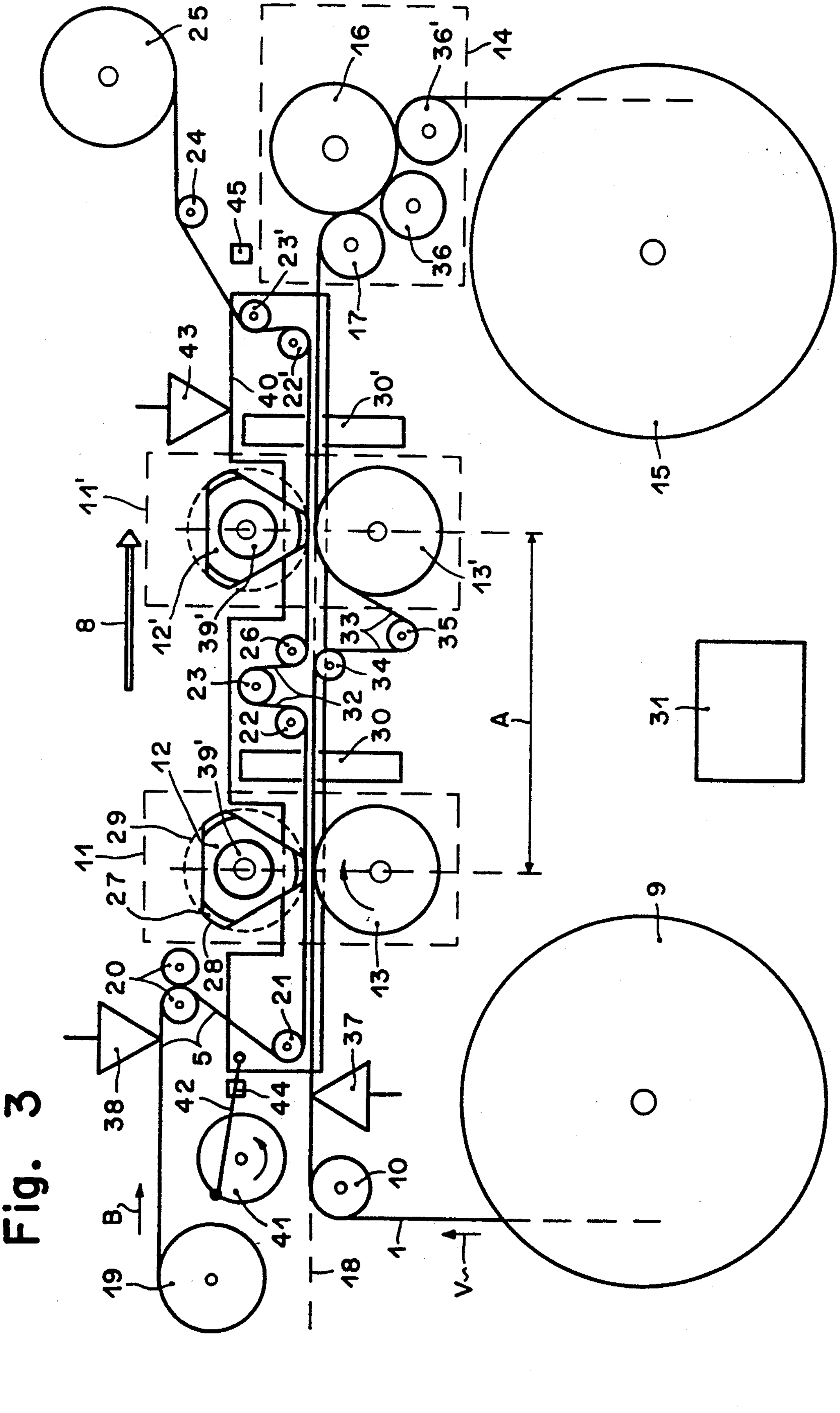
FIG. 3 shows an apparatus for sticking stamps onto the substrate in strip form.

The stamps 3, 3' are stuck onto the substrate 1 which is of strip form, by an apparatus shown in FIG. 3. The apparatus includes means for feeding and removing the substrate 1 and for unwinding and winding on the backing strip 5, a first strip guide means for the substrate 1 and at least one second strip guide means for the backing strip 5 with the hot embossing foil 4 (FIG. 2). The substrate 1 and the backing strip 5 are pulled through the sticking apparatus for example in the same direction of travel as indicated by the arrow 8. All axes of the cylinders and rollers required for strip guidance are oriented in mutually parallel relationship and are normal to the plane of the drawing in FIG. 3. The arrangements required for drive purposes are not shown herein.

The first strip guide means includes an unwinding roller 9 with a supply of the substrate 1 and a first direction-changing roller 10 on the one side of a sticking station 11 comprising a pressing cylinder 12 and a backing cylinder 13, and on the other side a pulling means 14 and a winding-on roller 15 which receives the substrate 1 with stamps 3, 3' (FIG. 1) stuck thereon.

The pulling means 14 which comprises at least one drive cylinder 16 and a second direction-changing roller 17 engages the substrate 1 by means of the drive cylinder 16 and the second direction-changing roller 17 and pulls it from the unwinding roller 9 at a predetermined forward feed speed V. Downstream of the first direction-changing roller 10, the substrate 1, together with the hot embossing foil 4, passes through between the cylinders 12 and 13 for sticking on the stamps 3, 3', and goes to the pulling means 14. The substrate with stamps 3, 3' stuck thereon is wound onto the winding-on roller 15 under a predetermined tension.

Further sticking stations 11' are advantageously arranged downstream of the first sticking station 11 and upstream of the pulling means 14 in order to make better use of the expensive hot embossing foil 4 if the stamp pitch MaT (FIG. 2) is shorter than the motif pitch MoT (FIG. 1) of the substrate 1. It is advantageous not to have to rewind the hot embossing foil 4 after each passage through the arrangement, which is necessary when making multiple use of the same hot embossing foil 4 by means of a single sticking station 11, thus avoiding the risk which that involves, of over-stretching the hot embossing foil 4.

Each sticking station 11' comprises a pressing cylinder 12' and a backing cylinder 13'. Each pair formed from the cylinders 12, 13 and 12', 13' respectively encloses a sticking plane 18 in which the substrate 1 and the backing strip 5 move through the sticking station 11 or 11' respectively. For example only one sticking plane 18 is common to the sticking stations 11, 11', that plane being a tangential plane in relation to all backing cylinders 13, 13'. A predetermined spacing A is provided between the sticking stations 11, 11'.

Each of the successively disposed sticking stations 11 and 11' transfers the respective stamp 3, 3' which immediately follows on the hot embossing foil 4 the stamp which has been stuck on by the preceding sticking station 11 or 11', into successive motifs or designs 2. When the last sticking station 11' has applied the stamp 3' at the predetermined motif 2, the following stamp 3 is again stuck into position in the next motif 2, by the first sticking station 11.

If the arrangement has for example two sticking stations 11 and 11', the first sticking station 11 transfers onto the substrate 1 stamps 3 which are contained on the hot embossing foil 4 for example at the first, third, fifth etc. positions in the stamp pitch MaT, while the following sticking station 11' sticks on stamps 3' which are arranged at the second, fourth, sixth etc. positions in the stamp pitch MaT.

On one side of the sticking station 11 or 11' respectively the second strip guide means has a supply roller 19, a pair of drive rollers 20 which are resiliently pressed together and a first strip roller 21. The drive rollers 20 are disposed between the supply roller 19 and the first strip roller 21. On the other side of the sticking station 11 or 11' respectively the second strip guide means additionally includes a second strip roller 22 or 22' for deflecting the backing strip 5 out of the sticking plane 18 and a third strip roller 23 or 23', an auxiliary roller 24 and a receiving roller 25. A further fourth strip roller 26 may be arranged between the sticking stations 11 and 11', downstream of the third strip roller 23 or 23' respectively but upstream of the sticking station 11'. All parts 19 to 26 of the second strip guide means are arranged on the side of the substrate 1 which faces towards the pressing cylinder 12 or 12'.

The backing strip 5 with the hot embossing foil 4 is unwound from the supply roller 19 at a predetermined strip speed B produced by the drive rollers 20 between which the backing strip 5 with the hot embossing foil 4 is passed. The first strip roller 21 brings the backing strip 5 down into the sticking plane 18. Downstream of the first strip roller 21 the backing strip 5 lies on the substrate 1, with the adhesive layer 6 (FIG. 2) of the hot embossing foil 4 facing towards the substrate 1. The two strips 1 and 5 are pulled through the sticking station 11 or through the sticking stations 11, 11'. Downstream of the sticking station 11 or 11', the second strip roller 22 or 22' respectively lifts the backing strip 5 off the substrate 1, with the stamp 3 or 3' (FIG. 1) which is stuck onto the substrate 1 in the sticking station 11 or 11' respectively being separated from the backing strip 5. The backing strip 5 with the remains of the hot embossing foil 4 is passed by way of the third strip roller 23 or 23' directly to the auxiliary roller 24 and is thereafter wound onto the receiving roller 25 under a predetermined tension, with for example the auxiliary roller 24 being in the form of a tension measuring means.

The pressing cylinder 12 or 12' respectively carries radially raised smooth pressing portions 27 which are uniformly distributed around its periphery and the pressing surfaces 28 of which are curved in such a way that they form parts of a concentric cylindrical surface 29 which is notionally attributed to the pressing cylinder 12 or 12' and which rolls against the substrate 1 in the region of the location which is prescribed for sticking the stamps 3, 3' thereon. For the sake of clarity reference numerals 27 to 29 are indicated only at a single location on the pressing cylinder 12. The circumference of the cylindrical surface 29 is for example an integral multiple of the motif pitch MoT. Preferably the pressing portions 27 are arranged replaceably on the pressing cylinder 12 or 12' in order to adapt the pressing surface 28 to the size and shape of the stamp 3 or 3'.

For example boundaries of the pressing surfaces 28 are in the form of a cutting edge (not shown herein) which is raised above the pressing surface 28 so that, when they are stuck into position, the stamps 3 and 3' are simultaneously cut out of the hot embossing foil 4. With that construction the sticking apparatus may also process the hot embossing foil 4 which has been mentioned in the opening part of this specification and whose backing strip 5 is in the form of a tough transparent protective layer which is fixedly connected to the hot embossing foil 4.

The pressing cylinders 12, 12' are displaceable on their respective shaft and thus permit lateral alignment of the pressing portions 27 in relation to the prescribed location for sticking the stamps on the motifs 2.

The pressing cylinder 12 or 12', per revolution thereof, involves at least one working cycle Az comprising a sticking phase and a forward feed phase, which preferably incorporate an intermediate phase following the sticking phase. FIG. 3 for example shows the pressing cylinders 12 and 12' with three pressing portions 27, in other words, three working cycles Az take place per revolution. It is possible to envisage a different mode of division of the pressing cylinder 12 or 12'. The pressing surfaces 28 roll against the backing cylinder 13 or 13' only during the sticking phases. The cylindrical surface 29 and the backing cylinder 13 or 13' rotate at a peripheral speed which corresponds to the forward feed speed V.

The pressing portions 27 and the backing cylinders 13 and 13' are at a predetermined temperature. The adhesive layer 6 can be heated to the temperature required for the sticking operation, on the one hand by the backing strip 5 and the hot embossing foil 4 and on the other hand by the substrate 1.

During the intermediate phase and the forward feed phase of the working cycle Az, the substrate 1 and the backing strip 5 are not pressed together. In the intermediate phase the substrate 1 and the backing strip 5 which are stuck together by the stamp 3 or 3' are advanced as far as the second strip roller 22 or 22', until the backing strip 5 is deflected out of the sticking plane 18 and the stamp 3 or 3' which has just been stuck on is separated from the backing strip 5 and from the hot embossing foil 4. The substrate 1 and the backing strip 5 are therefore freely displaceable in the forward feed phase which now takes place. The backing strip 5 is advantageously pushed back by a predetermined length during the remaining time of the intermediate phase in order to make better use of the hot embossing foil 4. As it is only during the sticking phase and the intermediate phase that the backing strip 5 moves at the forward feed speed V in the sticking plane 18, the necessary strip speed B is reduced relative to the forward feed speed V. Upstream and downstream of the sticking station 11 or 11' respectively strip rollers for example which are not shown herein and which are arranged on both sides of the sticking station 11 or 11' act as dancers to compensate for the irregular forward feed movement of the backing strip 5 in the sticking plane 18.

If the third strip roller 23 is disposed between two sticking stations 11 and 11', instead of guiding the backing strip 5 to the auxiliary roller 24, it guides it back into the sticking plane 18 by means of the fourth strip roller 26 so that the backing strip 5, together with the substrate 1, is passed through the following sticking station 11'. The second strip roller 22' associated with that sticking station 11' again lifts the backing strip 5 away from the sticking plane 18, with a further stamp 3' which has been stuck onto the substrate remaining thereon. The backing strip 5 which is used, according to the number of sticking stations 11, 11' through which it passes is then passed by way of the associated third roller 23' and by means of the auxiliary roller 24 to the receiving roller 25.

Advantageously, a cooling section 30 or 30' is arranged immediately downstream of each respective sticking station 11 or 11' so that the adhesive layer 6 of the stamp 3 or 3' is sufficiently cooled down prior to separation of the stamp 3 or 3', when the backing strip 5 is guided around the second strip roller 19 or 19', and the adhesive thus develops sufficient strength in order to prevent the edges of the stamp 3 or 3' suffering from fraying when the stamp is removed from the hot embossing foil 4.

The drive systems (not shown herein) of the sticking stations 11, 11', the pulling means 14, the winding-on roller 15, the drive rollers 20 and the receiving roller 25 are connected to a common control arrangement 31 by means of lines which are not shown herein. Control parameters can be detected by means of sensors (not shown) and passed to the control arrangement 31. It computes therefrom, in mutually matching relationship, the drive power and the speed of rotation for each drive system. The control arrangement 31 monitors the temperatures of all heated surfaces, for example the pressing surfaces 28, and the cooling output of the cooling sections 30 and 30', with control parameters being passed thereto by means of temperature sensors (not shown).

The above-described sticking apparatus makes it possible for the stamps 3 and 3' to be stuck onto the substrate 1 at predetermined locations, in mutually isolated relationship, in a continuous procedure, without the substrate 1 having to be stopped for the sticking operation in the sticking station 11 or 11', and then accelerated again. That is achieved by virtue of the particular form of the pressing surfaces 28 which are parts of a cylindrical surface 29 which is concentric with respect to the pressing cylinder 12 or 12' and the peripheral speed of which, in the rolling movement of the pressing portions 27 against the backing cylinder 13 or 13' respectively, is equal to the forward feed speed V.

Between two sticking stations 11 and 11' which are arranged in succession at the spacing A, the backing strip 5 advantageously forms a storage loop 32, immediately downstream of the cooling section 30. The length of the loop 32 can be adjusted in a predetermined manner by adjustment in respect of the height of the third strip roller 23 above the sticking plane 18. That makes it possible to match the stamp pitch MaT to the spacing A and the motif pitch MoT.

It is advantageous to provide between the sticking stations 11 and 11' a storage loop 33 for the substrate 1, which is arranged on the same side of the plane 18 as the backing cylinder 13 or 13'. For example a deflector roller 34 guides the substrate 1 out of the sticking plane 18 and away from the backing strip 5. The substrate 1 passes around a tensioning roller 35 which is displaceable perpendicularly to the sticking plane 18, and goes back into the sticking plane 18 again by way of the downstream backing cylinder 13'. The length of the storage loop 33 is predetermined by the distance of the tensioning roller 35 relative to the sticking plane 18. The motif pitch MoT of the substrate 1 can be adapted to the spacing A and the stamp pitch MaT by displacement of the tensioning roller 35.

The sticking stations 11 and 11' are advantageously arranged displaceably in the sticking plane 18 in order to adapt the spacing A to the motif pitch MoT and the stamp pitch MaT. Depending on the particular requirements involved, individual sticking stations 11' may additionally be installed in the sticking plane 18 or removed from the sticking apparatus.

The pulling means 14 is advantageously designed for a post-treatment of the motif 2 which has been completed by the application of the stamp 3 or 3'. If a post-embossing operation or a printing operation is effected, a further safety feature which extends over parts of the substrate 1 and the stamp 3, 3' can be applied to the substrate 1 by means of those working operations. The drive cylinder 16 can be provided for example in the form of an embossing or printing roller. The post-treatment operation involved may also be a process involving reheating of the adhesive layer 6 of the stamp 3 or 3' in order to improve its bonding strength to the substrate 1, particularly when high forward feed speeds V are involved. As a post-embossing station or as a printing station, the pulling means 14 additionally has at least one backing roller 36 and a guide roller 36', which roll against the drive cylinder 16. For the post-embossing or the reheating operation, the means 16, 17, 36 and 36' can be heated to a predetermined temperature. If the forward feed speed V attains 60 meters per minute or more, then, instead of a single backing roller 36, the arrangement preferably has a plurality thereof on the drive cylinder 16 so that the adhesive layer 6 is heated for a sufficiently long period of time.

The sticking apparatus advantageously has sensors 37 and 38 which are connected to the control arrangement 31 in order to ensure that the stamps 3 and 3' are stuck onto the motifs 2 at the prescribed locations, in a highly accurate fashion. The sensors 37 and 38 are for example optical reading devices which receive light in a transmission or reflection mode, with the received light being modulated by each graduation marking which moves past at the forward feed speed V and the strip speed B respectively. At the moment at which each graduation mark goes past, the sensor 37 or 38 outputs a pulse signal to the control arrangement 31. The sensor 37 or 38 is preferably displaceably and/or replaceably fixed in position so that, in the event of a change, it can be quickly adapted to the position of the graduation marks on the new substrate 1 or the new hot embossing foil 4.

For example the first sensor 37 is disposed between the first direction-changing roller 10 and the first sticking station 11 and records the movement therepast of the graduation marks on the substrate 1. They provide for integral subdivision of the motif pitch MoT and for example are printed on one of the two sides of the substrate 1, together with the motifs 2.

The second sensor 38 is disposed for example between the supply roller 19 and the drive rollers 20 and reads the graduation marks which move therepast from the hot embossing foil 4. They provide for integral subdivision of the stamp pitch MaT.

Preferably the pressing cylinder 12 or 12' has a rotary pick-up or sender 39 and 39' respectively which is connected to the shaft thereof so that it is possible to transmit a precise value in respect of the angle of rotation of the pressing cylinder 12 or 12' respectively, by way of lines (not shown) to the control arrangement 31.

The control arrangement 31 processes the signals from the sensors 37 and 38 and the rotary senders 39 and 39' and sets the strip speed B, the forward feed speed V and the angular speed of the pressing cylinder 12 or 12' to the predetermined values so that the stamps 3, 3' are precisely aligned in the sticking station 11 or 11', in relation to the location intended therefor on the motifs 2.

The control arrangement 31 advantageously regulates the angular speed of the pressing cylinder 12 or 12' during each sticking and intermediate phase in such a way that the peripheral speed of the pressing surfaces 28 is equal to the forward feed speed V. The angular speed of the pressing cylinders 12 and 12' can be reduced or increased during the forward feed phase, depending on whether the motif pitch MoT is greater or smaller than the spacing of the pressing surfaces 28 on the cylindrical surface 29.

It is advantageous for the arrangement to include a carriage 40 which is displaceable parallel to the sticking plane 18 and on which the shafts of the strip rollers 21, 22, 23 and 21, 22, 22', 23, 23' and 26 are arranged so that the backing strip 5 can be unwound from the supply roller 19 at a strip speed B which is lower in comparison with the forward feed speed V, so that it can be put to better use. In the plane 18 the backing strip 5 moves at a speed which is composed of the strip speed B and the speed of the carriage 40 and which is equal to the forward feed speed V of the substrate 1 at least during the sticking and intermediate phases. Movement of the carriage 40 in the forward feed direction 8 or in opposite relationship thereto increases the speed of the backing strip 5 in the sticking plane 18 relative to the strip speed B or reduces it, or reverses it, in other words the backing strip 5 is pulled back by a predetermined length in opposite relationship to the forward feed direction 8.

A drive 41, for example by means of a linkage 42, transmits the predetermined periodic movement to the carriage 40, the speed of which is predetermined at each point in the movement. A travel measuring device 43 is arranged at a stationary position on the sticking apparatus and for example reads off travel marks on the carriage 40. The travel measuring device 43 is connected to the control arrangement 31 by means of lines (not shown) and transmits the respective position of the carriage 40 on its predetermined travel path which is delimited by two reversal points 44 and 45, to the control arrangement 31, by means of signals. The control arrangement 31 controls the speed of rotation of the drive 41 in dependence on the position of the carriage 40 and the signals from the sensors 37 and 38 and the rotary senders 39 and 39'. The drive 41 is advantageously for example a stepping or linear motor which is actuated by means of a predetermined pulse train from the control arrangement 31 because the predetermined differential speed V-B on the travel path can be produced in the forward feed direction 8 during a major part of the working cycle Az and the movement of the carriage 40 can be adapted in the optimum fashion in each case to the motif pitch MoT and the stamp pitch MaT.

The substrate 1 is pulled through the sticking stations 11 and 11' by the pulling means 14 at the predetermined uniform forward feed speed V which is regulated by the control arrangement 31 by means of the signals from the sensor 37. By means of a predetermined value which gives the number of graduation marks in each motif pitch MoT, the control arrangement 31 computes the necessary angular speed of the pressing cylinders 12 and 12' in dependence on the respective phase of the working cycle Az. At the same time the strip speed B is imparted to the backing strip 5 by the drive rollers 20; the speed B is regulated by means of the signals from the sensor 38 and two predetermined values of which the first gives the number of graduation marks in each stamp pitch MaT and the second gives the number of sticking stations 11 and 11'. Immediately prior to each sticking phase, the carriage 40 is moved from the first reversal point 44 in the forward feed direction 8 to the second reversal point 45 in a uniform manner at the differential speed V-B.

The stamp 3 or 3' in the hot embossing foil 4 moves at the forward feed speed V in the sticking plane 18 together with the substrate 1 and lies on the motif 2 at the predetermined location thereon. From the time sequence of the signals from the sensors 37 and 38, the control arrangement 31 recognises precise alignment of the stamps 3 and 3' in relation to the motif. Any deviations are eliminated by brief variations in the strip speed B. The control arrangement 31 synchronises the movement of the motif 2 relative to the pressing portion 27 by means of the signals from the sensor 37 and the rotary sender 39 or 39' so that the pressing surfaces 28 are precisely aligned in relation to and roll against the stamps 3 and 3'.

During the sticking phase the adhesive layer 6 is heated on a generatrix of the cylindrical surface 29 and is stuck to the substrate 1 under the pressure applied by the pressing portion 26 and the backing cylinder 13 or 13'. In the intermediate phase the backing strip 5 and the substrate 1 pass in mutually superposed relationship through the cooling section 30 or 30'. Thereafter the strength of the adhesive in the adhesive layer 6 is so great that the stamp 3 or 3' is firmly affixed to the substrate 1 and is separated from the hot embossing foil 4 when the backing strip 5 is guided away from the substrate 1 by means of the strip roller 22 or 22' respectively.

In the meantime the carriage 40 has reached the second reversal point 45 and moves back to the first reversal point 44 during the forward feed phase in order to be set in movement again in the forward feed direction 8, just prior to the beginning of the next sticking phase.

Figure 4:
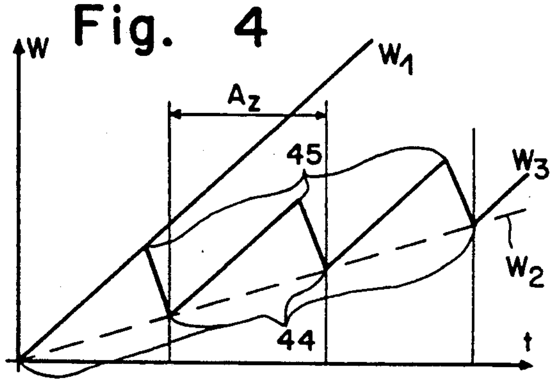
FIG. 4 shows a diagram, for illustrating the working cycle of the apparatus.

The drive rollers 20 move the backing strip 5 forwardly in a working cycle Az by as many stamp pitches MaT as the number of stamps 3 and 3' which are simultaneously stuck on the substrate during the sticking phase. That procedure is shown in the FIG. 4 diagram. The reference characters which are referred to hereinafter and which are not shown in FIG. 4 refer to FIG. 3. In a time t which corresponds to the sticking and intermediate phases of the working cycle Az, the substrate 1 covers a distance $W_1$ at the forward feed speed V. In the same time t the backing strip 5 is unwound from the supply roller 19 over a distance $W_2$ at the strip speed B and moved in the sticking plane 18 by a distance $W_3$. The function of the distance $W_3$ during each working cycle Az arises out of the distance $W_2$ shown in broken lines and the superimposition of the movement of the carriage 40. Between each first reversal point 44 and each second reversal point 45 the backing strip 5 is moving at a forward feed speed V while it is moved back by a predetermined length between each second reversal point 45 and each first reversal point 44, that is to say during the forward feed phase.

Figure 5:
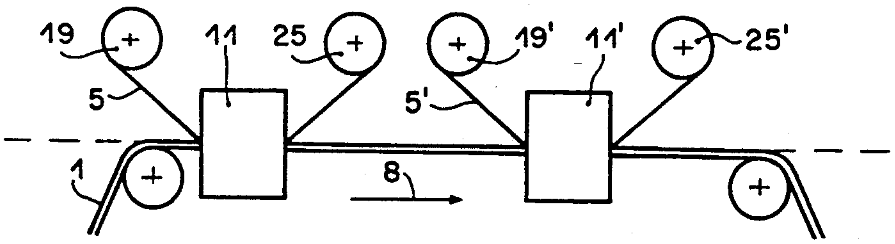
FIG. 5 shows the sticking apparatus with two separate feeds for hot embossing foils.

In FIG. 5 each sticking station 11 or 11' or each group of such stations 11 and 11' advantageously has the backing strip 5 or 5' associated therewith, with independent strip guide means which are indicated in the drawing by the unwinding and winding-on rollers 19, 25 and 19', 25' respectively. That arrangement permits at least two stamps 3 and 3' (FIG. 1) to be stuck onto the same motif 2 (FIG. 1) or permits at least one respective stamp 3 or 3' respectively to be stuck onto motifs 2 of the same substrate 1, which motifs 2 are disposed in juxtaposed relationship transversely with respect to the direction of travel 8. It is also possible to stick onto the substrate different stamps 3 and 3' which can also be of different sizes.

Figure 6:
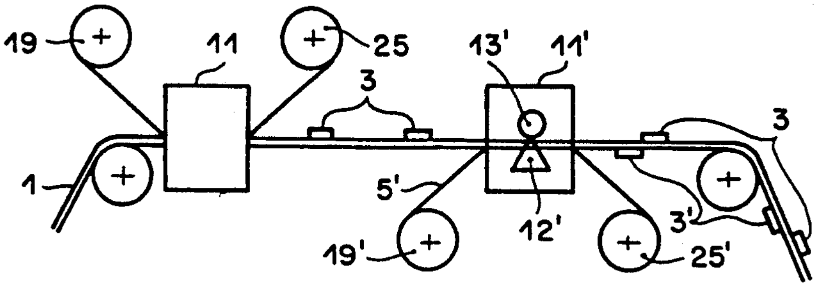
FIG. 6 shows an apparatus for sticking the stamps on, on both sides.

For example the two sticking stations 11 and 11' are arranged as shown in FIG. 6 in order to stick the stamps 3 and 3' on both sides of the substrate 1. The independent strip guide means are indicated in the drawing by the unwinding and winding-on rollers 19, 25 and 19', 25' respectively. In the second sticking station 11' the arrangement of the pressing cylinder 12' and the backing cylinder 13' is interchanged in relation to the configuration used in the first sticking station 11, with the strip guide means 19', 25' for the backing strip 5' being provided on the side of the pressing cylinder 12' of the substrate 1. When the substrate 1 leaves the sticking apparatus, it has the stamps 3 which are stuck thereon in the first sticking station 11, on one side, and the stamps 3' which are affixed by the second sticking station 11', on the other side.

Figure 7:
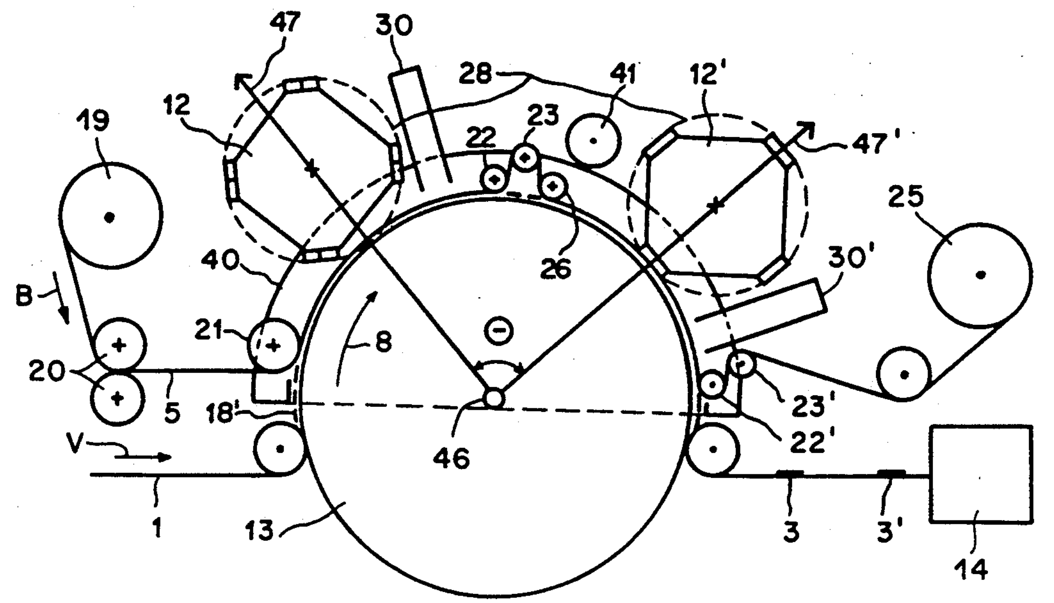
FIG. 7 shows a compact sticking apparatus.

In FIG. 7 the sticking plane 18 (see FIG. 3) is advantageously in the form of part of the peripheral surface 18' of the single backing cylinder 13 in order to save space by rolling up the sticking plane 18. At least one pressing cylinder 12 or 12' is arranged on the backing cylinder 13 in such a way that the cylindrical surface 29 of the pressing cylinder rolls against the backing cylinder 13. The pressing cylinder 12 or 12', with the backing cylinder 13, forms the respective sticking station 11 or 11' (FIG. 3). Enclosed between the radial lines 47, 47' which extend from an axis 46 of the backing cylinder 13 and which intersect the axes of the pressing cylinders 12 and 12' is an angle $\theta$ which determines the spacing A (FIG. 3) between the sticking stations 11 and 11'. The sticking stations 11 and 11' are displaceable on the peripheral surface 18' in the direction of the axes 46 or rotationally about the axis 46, with the angle $\theta$ being variable.

The carriage 40 is in the form of a sector of a circle whose apex (not shown herein) is rotatable about the axis 46. The drive 41 displaces the carriage 40 with a swinging movement about the axis 46 with the duration of an oscillation movement corresponding to the length of the working cycle Az. The axes of the strip rollers 21, 22 and 23 or 21, 22, 22', 23, 23' and 26 respectively move on the carriage 40 at a predetermined radial distance about the axis 46.

The backing cylinder 13 rotates in the forward feed direction 8 and moves at a peripheral speed which corresponds to the forward feed speed V of the substrate 1, which is produced by the pulling means 14. The drive rollers 20 convey the backing strip 5 from the supply roller 19 to the first strip roller 21 and the used backing strip 5 from the third strip roller 23 or 23' to the receiving roller 25. Downstream of the cooling section 30 or 30' the strip roller 22 or 22' lifts the backing strip 5 off the substrate 1, in which case the stamps 3 and 3' which are stuck on the substrate 1 are released from the backing strip 5.

Figure 8:
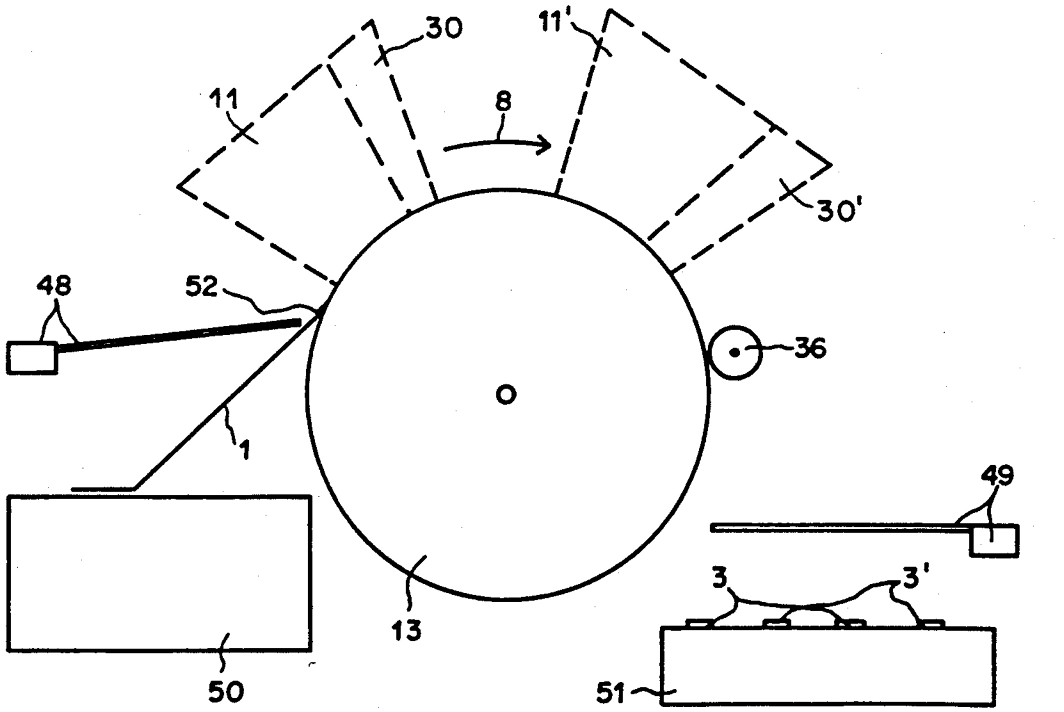
FIG. 8 shows a device for substrates in sheet form.

If for example stamps 3, 3' are to be stuck onto substrates 1 in sheet form, as shown in FIG. 8, the substrate feed and removal means advantageously comprise a feeder device 48 and a delivery device 49. A supply stack 50 is arranged in the region of the feeder device 48 upstream of the backing cylinder 13 in the forward feed direction 8. Disposed downstream of the backing cylinder 13 within the range of operation of the delivery device 49 is a deposit stack 51 on which the substrates 1 with marks stuck thereon are stacked in superposed relationship. For transportation of the stubstrate 1 in sheet form over the peripheral surface 18', the backing cylinder 13 has at least one entrainment member 52 which engages and releases the substrate 1 on the peripheral surface 18' at a predetermined angle of rotation of the backing cylinder 13. The feeder device 48, the delivery device 49 and the entrainment member 52 are connected by means of lines (not shown) to the control arrangement 31 which is operable to synchronise the movements of the feeder device 48 and the delivery device 49 with the corresponding positions of the entrainment member 52.

The feeder device 48 lifts a single substrate 1 from the supply stack 50 and guides the leading edge thereof synchronously to the entrainment member 52 on the backing cylinder 13. The substrate 1 engaged by the entrainment member 52 bears snugly against a part of the peripheral surface 18′ which is predetermined by the size of the substrate 1, and in that condition is passed to at least one sticking station 11 or 11′ and has the stamp 3 or 3′ stuck thereon. For example at least one backing roller 36 may be arranged for the post-treatment operation on the backing cylinder 13, with the substrate 1 with the stamp stuck thereon passing through beneath the backing roller 36. The delivery device 49 lifts the substrate 1 off the peripheral surface 18′ at the predetermined angle of rotation at which the entrainment member 52 releases the substrate 1, and lays it in an orderly fashion on the deposit stack 51.

A combination of the arrangements shown in FIGS. 5 and 8 is also possible.

Figure 9:
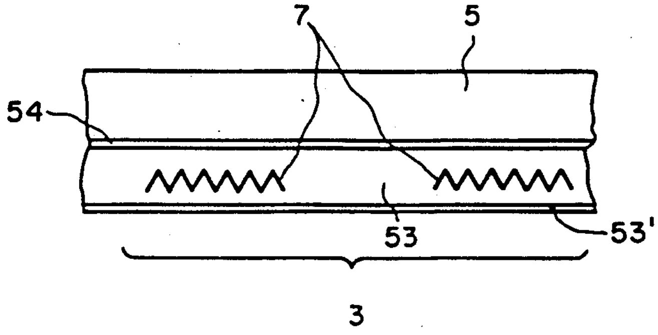
FIG. 9 shows an embossing foil.

Instead of a hot embossing foil 4 (FIG. 2) it is also possible to use a conventional foil without adhesive layer 6 (FIG. 2), for example an embossing foil illustrated at 53 in FIG. 9, which has the stamps 3 and 3′ (FIG. 2). In FIG. 9 reference numeral 5 identifies the backing or carrier strip comprising paper, polyester etc. as a carrier of the embossing foil 53 with a low level of tensile strength. The embossing foil 53 is stuck onto the backing strip 5 with a separating layer 54, wherein the adhesive force thereof can be nullified for example by the effect of heat.

Embedded into the embossing foil 53 are for example the optically variable diffraction patterns 7 such as diffraction gratings or holograms, wherein the material of the embossing foil 53 is highly transparent at least in regard to a part of the electromagnetic waves in the range of wavelengths from 0.3 to 10 μm. Portions of the embossing foil 53 form the stamps 3 which are composed of the diffraction patterns 7. For example, after being stuck onto a bond, security or share document, they serve as a visually striking authentication feature.

The adhesive strength of the stamps 3 which are stuck on the substrate may be improved in the case of certain adhesives by means of a bonding layer 53′ which is applied to the side of the embossing foil 53 which is intended to be stuck on.

Figure 10:
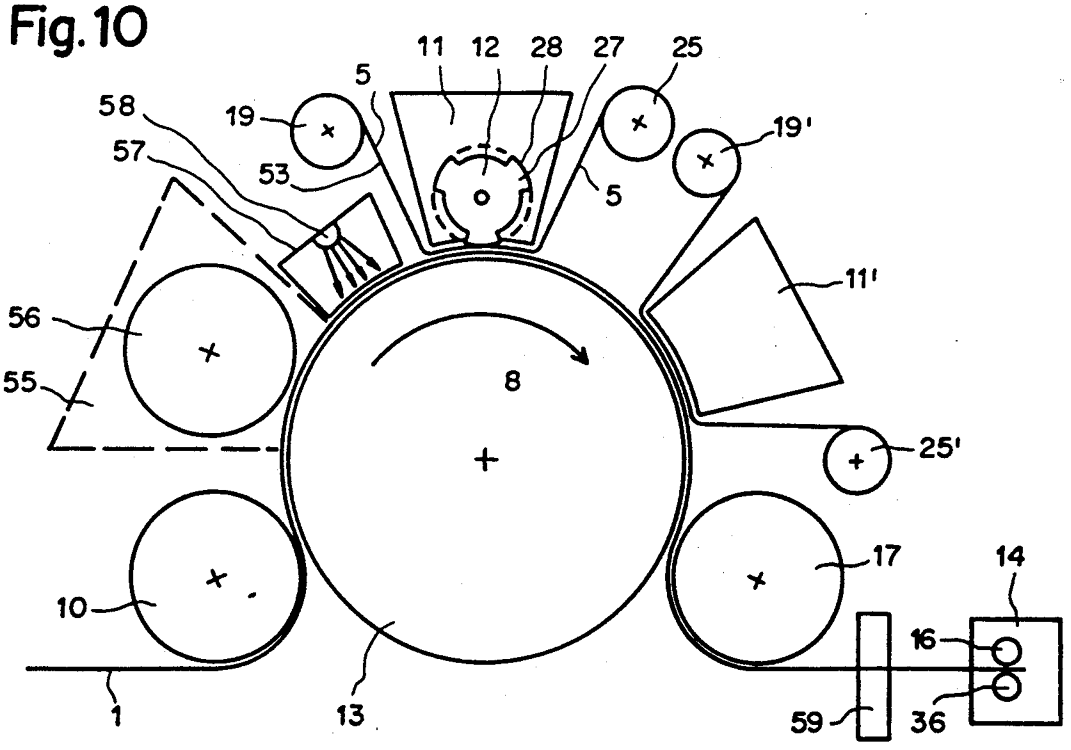
FIG. 10 shows an apparatus for sticking on stamps from the embossing foil.

In FIG. 10 the substrate 1 in strip form is applied to the backing cylinder 13 by the first direction-changing roller 10 and passed through beneath at least one sticking station 11, 11′ (FIG. 3) to the second direction-changing roller 17 which lifts the substrate 1 away from the backing cylinder 13 and feeds it to the pulling means 14. The pulling means 14 pulls the substrate 1 through the sticking apparatus.

Adhesives on an epoxy resin or acrylate resin basis are advantageously suitable for sticking foils of plastic material as the adhesive strength thereof is activated in a predetermined fashion by means of electromagnetic beams or by means of particle beams and as no cooling section 30 or 30′ (FIG. 3) is required. It is possible for example to use ultraviolet, X-ray, gamma or electron beams, in which respect UV-light is particularly simple to handle.

The adhesive is applied at relatively low viscosity with an applicator mechanism 55, in a similar manner to a printing ink, with an applicator roller 56 having predetermined resilient pressure surfaces (not shown) which roll against the surface to be coated, to provide for transfer of the adhesive. After the application operation the adhesive is activated for example while still upstream of the first sticking station 11. An irradiation station 57 has a beam source 58 which produces a radiation dose sufficient for activation of the adhesive strength of the applied adhesive. In contrast to acrylate resin-based adhesives, epoxy resin-based adhesives can also be activated in the presence of oxygen in the air.

For example the applicator mechanism 55 is arranged between the first direction-changing roller 10 and the first sticking station 11 on the backing cylinder 13 on which the substrate 1 is transported in the direction of travel 8. The applicator mechanism 55 puts a coating of adhesive on the surfaces of the substrate 1 which are intended for the sticking operation.

Application of the low-viscosity adhesive to the substrate 1 affords the advantage of levelling out any surface structure on the substrate 1 at the location intended for sticking the stamp thereon, so that the brilliance of the stamp 3 (FIG. 9) is not adversely affected by that surface structure.

The irradiation station 57 is arranged downstream of the applicator mechanism 55 and upstream of the first sticking station 11. When using acrylate-based adhesive, the activated adhesive is to be protected from the oxygen in the air, for example by means of a local nitrogen atmosphere, until the stamps 3 are stuck on.

The embossing foil 53, together with its backing strip 5, is fed to each sticking station 11, 11′ by the supply roller 19, 19′. A pressing cylinder 12, by means of its pressing portions 27 which do not necessarily have to be heated, transfers the stamps 3 onto the predetermined locations of the substrate 1, which have been prepared with adhesive. The stamps 3 have sufficient adhesion at the locations which have been made tacky and viscous by the activation operation so that they satisfactorily come out of the embossing foil 53 and away from backing strip 5. Pressing surfaces 28 which are advantageously heated supply heat to the stamp 3 and facilitate release from the backing strip 5.

After the stamps 3 have been stuck on, the receiving roller 25, 25′ receives the remains of the embossing foil 53 and the backing strip 5.

The adhesive between the stamp 3 and the substrate 1 reaches its full adhesive strength at room temperature after a curing time of a maximum of 48 hours. The apparatus has the advantage that the embossing foil 53 has to be subjected to a lower level of thermal loading and the low-viscosity adhesive can be more easily adapted to the surface structure of the substrate 1 than a hot embossing foil.

The supply of a predetermined amount of energy after the activation operation in the form of heat or irradiation to the adhesive under the stamp 3 shortens the curing time of the adhesive as the substrate 1 with the stamp 3 stuck thereon can be processed more quickly.

The supply of energy to the adhesive can be effected in a post-treatment operation both on one side through the stamp 3 or through the substrate 1 and also from both sides. For example the heat is supplied by means for the heated pressing surfaces 28 of the pressing cylinder 12 and/or by means of the heated drive cylinder 16 and the backing rollers 36 in the pulling means 14 or the energy is passed into the adhesive by means of radiation in a further irradiation assembly 58 disposed between the direction-changing roller 17 and the pulling means 14, while besides the above-mentioned kinds of radiation, it is also possible to use the entire range of electromagnetic waves which is suitable for heat production (IR, micro-, centimeter waves etc.).

Figure 11:
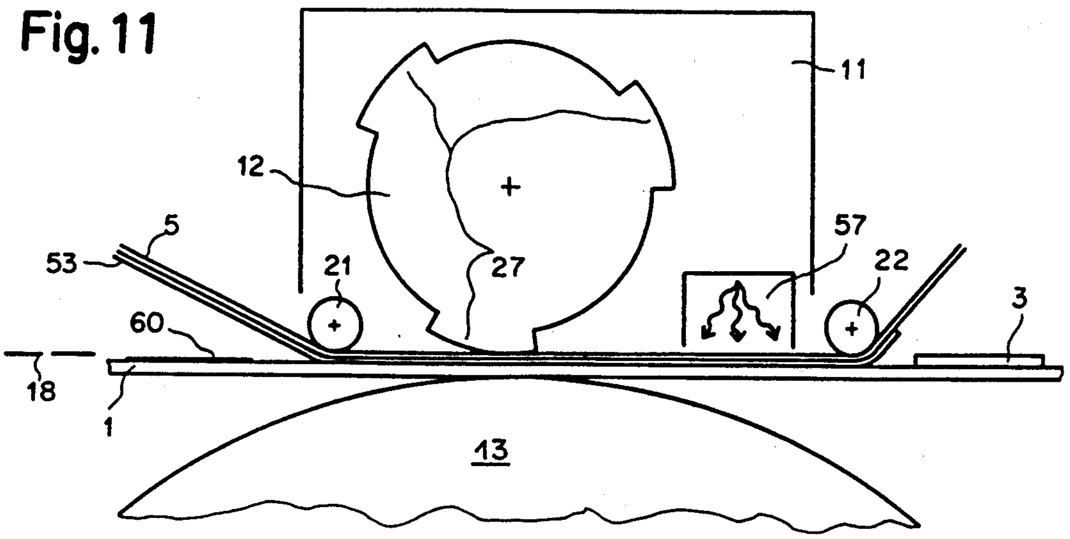
FIG. 11 shows a sticking station.

In FIG. 11 the irradiation station 57 is disposed downstream of the sticking station 11. Acrylate resin-based adhesives can preferably be used as the activation operation is effected only after affixing of the stamps 3 and the stamps 3 deny oxygen access to the activated adhesive, even without a nitrogen atmosphere. The first strip roller 21 lowers the backing strip 5 with the embossing foil 53 facing towards the substrate 1, into the sticking plane 18. The irradiation station 57 is disposed downstream of the pressing cylinder 12 and upstream of the second strip roller 22. The substrate 1 which has a layer of adhesive 60 applied thereto at the prescribed locations passes together with the embossing foil 53 between the pressing cylinder 12 and the backing cylinder 13. The pressing surface 28 presses the stamp 3 of the embossing foil 53 against the adhesive layer 60, with all air bubbles beneath the stamp 3 being pressed away. As a result of the surface tension of the adhesive, the embossing foil 53 remains adhering to the non-activated adhesive layer 60 until the radiation in the subsequent irradiation station 57 initiates activation of the adhesive. The radiation dose is so predetermined that the adhesive strength of the stamps 3 to the substrate 1 is already so great, after further transportation movement to the second strip roller 22, that, when the backing strip 5 lifts away downstream of the strip roller 22, the stamp 3 is released out of the embossing foil 53 and from the backing strip 5. Only irradiation through the backing strip 5 and the embossing foil 53 is shown by way of example.

Figure 12:
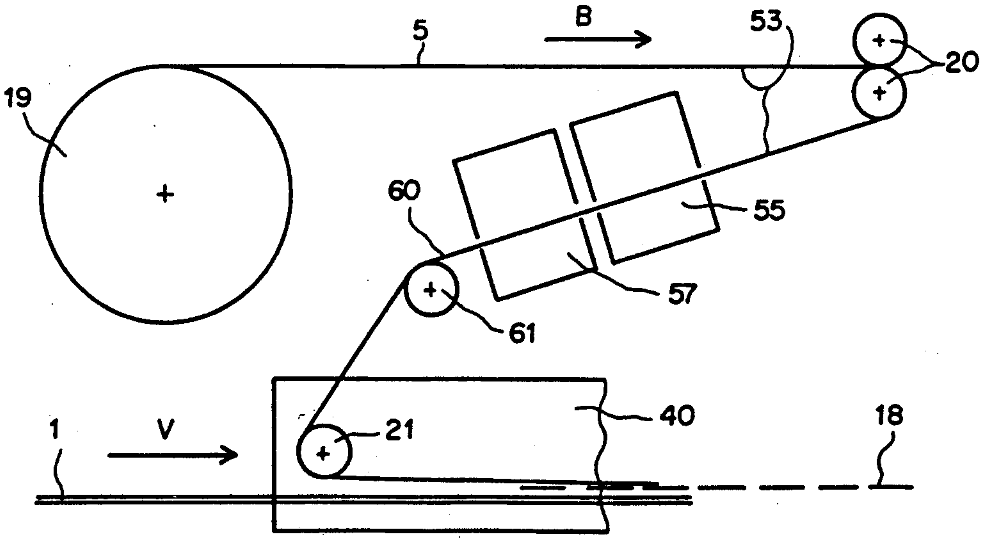
FIG. 12 shows an applicator mechanism for applying adhesive to the embossing foil.

As illustrated in FIG. 12, it is also possible for the adhesive to be applied directly to the embossing foil 53, instead of to the substrate 1, for example in an adhesive layer 60 which is applied over the full surface of the embossing foil. The backing strip 5 with the embossing foil 53 is unwound from the supply roller 19 by means of the drive rollers 20 at the strip speed B. The backing strip 5 is diverted into the sticking plane 18 by way of a fixedly disposed auxiliary roller 61 and the first strip roller 21 which is movable with the carriage 40, in such a way that the backing strip 5 moves over the rollers 21 and 61 and that the adhesive layers 60 applied to the embossing foil 53 do not come into contact with the rollers 21 and 61. The applicator mechanism 55 and in some cases the irradiation station 57 is arranged along the path of movement of the embossing foil 53 between the drive rollers 20 and the auxiliary roller 61. That arrangement advantageously makes available more time for applying and possibly activating the adhesive as the strip speed B is lower than the forward feed speed V of the substrate 1.

The apparatuses shown in FIGS. 10 through 12 can be combined with those shown in FIGS. 3 and 5 through 8.

What is claimed is:

1. Apparatus for sticking stamps from a foil onto motifs printed at a motif pitch on a substrate said foil facing towards said motifs on said substrate and, having said stamps spaced at a stamp pitch and a backing strip, said sticking being caused by pressing means whose work cycle comprises a sticking phase and a forward feed phase, said apparatus comprising means for unwinding said foil and backing strip and for winding-on the backing strip and means for supplying and removing the substrate, motor driven carriage means, which is displaceable in parallel to a feed direction of said substrate, for cyclically adding speed to said foil moving at a strip speed at the beginning of, and during, said sticking phase and for cyclically subtracting speed from said foil during said forward feed phase, and at least one sticking station through which said foil with said backing strip and said substrate are passed in the same feed direction, wherein said at least one sticking station comprises a pressing cylinder and a backing cylinder disposed adjacent to said pressing cylinder, said pressing cylinder having at least one radially raised smooth pressing portion whose pressing surface is part of a cylindrical surface which is concentric with respect to the pressing cylinder and which is adjacent to the backing cylinder during the sticking phase only, and in which, by a displacement of said motor driven carriage means, said foil with the backing strip is accelerated to move at the same uniform forward feed speed of the substrate immediately prior to each sticking phase, and said substrate and said foil on said backing strip are pressed between said pressing surface and said backing cylinder running at a circumference speed equal to the forward feed speed of the substrate, and such that after said sticking phase, a gap opens between the pressing cylinder and the backing cylinder so that during said forward feed phase said backing strip is separated from said stamp sticking on said substrate and is decelerated by the displacement of said motor driven carriage means to move independently from the substrate in said gap.

2. Apparatus according to claim 1, wherein there is further provided one or more sensor means for sensing graduation marks on the foil and substrate respectively; and a control means connected to the or each sensor, and operable to regulate a strip speed of the backing strip, the forward feed speed, and for synchronising the positions of the stamps, motifs and the pressing portions in response to signals from the or each sensor.

3. Apparatus according to claim 2, wherein the control means is operable to regulate the angular speed of the pressing cylinder such that during each sticking phase the peripheral speed of the pressing surfaces is equal to the forward feed speed of the substrate and during the forward feed phase the angular speed of the pressing cylinder is varied by the control means to synchronize the pressing portions onto the stamps and the motifs.

4. Apparatus according to claim 1, wherein at least two sticking stations are arranged one after the other, the sticking stations being designed for alternately sticking the stamp from the same foil onto the substrate in successively following motifs.

5. Apparatus according to claim 1, wherein at least two sticking stations are arranged one after the other, and wherein each sticking station has its own unwinding and winding-on station for the backing strips which are supplied separately, and that in the sticking stations the stamps are stuck on the predetermined side of the substrate from associated foils.

6. Apparatus according to claim 1, wherein the pressing cylinders of the sticking stations have a single common backing cylinder and wherein the sticking stations include a predetermined angular displacement in relation to the axis of the backing cylinder.

7. Apparatus according to claim 1, wherein the substrate is in sheet form, and that there are provided a feeder device, a delivery device and at least one entrainment member disposed on the backing cylinder for transportation of the substrate on the peripheral surface, such that the feeder device is operable to feed the substrate from a supply stack onto the backing cylinder, the entrainment member is operable to engage and release the substrate at predetermined angles of rotation of the backing cylinder, and that the delivery device is operable to remove the substrate with stamp stuck thereon from the backing cylinder and deposit the substrate on a deposit stack.

8. Apparatus according to claim 1, wherein the pressing portion includes a heated pressing surface.

9. Apparatus according to claim 1, wherein the foil on the backing strip is an embossing foil without adhesive layer, and in which disposed at a predetermined location upstream of the first sticking station is an applicator mechanism for applying adhesive layers to the substrate at the locations which are intended for sticking stamps thereon.

10. Apparatus according to claim 1, wherein the foil on the backing strip is an embossing foil without adhesive layer, and in which at a predetermined location upstream of the sticking station there is an applicator mechanism for applying adhesive layers to the side of the embossing foil which is remote from the backing strip.

11. Apparatus according to claim 9, in which the adhesive of the adhesive layers can be activated by radiation, and in which there is at least one irradiation station for activation of the adhesive.

12. An apparatus for transferring stamps from a foil, having a backing strip, to motifs printed on a substrate comprising:

means for supplying the foil at a strip speed B and for removing the backing strip, means for transporting the substrate adjacent to, and in the same feed direction of, the foil at a forward feed speed V, at least one sticking station, receiving the foil and substrate adjacent to one another, for transferring the stamp from the foil to a motif printed on the substrate, and comprising a backing cylinder and a pressure cylinder, disposed adjacent to said backing cylinder, for receiving and pressing together the stamp on the backing strip and the motif printed on the substrate during a sticking phase of a work cycle of said pressure and backing cylinders and for providing a gap between said pressure and backing cylinders after said sticking phase, including during a forward feed phase of said work cycle; and carriage means, cyclically displaceable along a feed direction of the substrate and which carries said foil and backing strip through said sticking station, for displacing with said forward feed direction and adding the displacement speed of said carriage means to the strip speed B of said foil to attain said forward feed speed V of said substrate at the beginning of, and during, said sticking phase and for displacing opposite to said feed direction and subtracting speed from the strip speed B of said foil during said forward feed phase to align the next stamp on the backing strip with a corresponding motif pattern of the substrate.

* * * * *